United States Patent Office 3,036,075
Patented May 22, 1962

3,036,075
FORMYL SUCCINONITRILES AND PYRIMIDYL-
ACETONITRILES AS INTERMEDIATES FOR
VITAMIN B₁
Donald W. Kaiser, New Haven, Conn., assignor to Olin Mathieson Chemical Corporation, New York, N.Y., a corporation of Virginia
No Drawing. Filed May 2, 1958, Ser. No. 732,424
8 Claims. (Cl. 260—256.4)

This invention relates to a process for preparing 2-methyl-4-amino-5-pyrimidylacetonitrile, a chemical compound of the formula

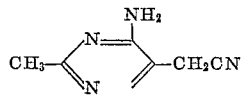

and to intermediates utilizable in the preparation thereof.

2-methyl-4-amino-5-pyrimidylacetonitrile is useful in the preparation of 2-methyl-4-amino-5-pyrimidylacetamide, a well-known intermediate useful in the preparation of vitamin $B_1$.

Thus, the use of the compounds of this invention enables the preparation of vitamin $B_1$ by a route heretofore unknown employing easily accessible starting materials.

The preparation of 2-methyl-4-amino-5-pyrimidylacetonitrile is accomplished by the process of this invention, the first step of which comprises converting succinonitrile (I) to salts of formylsuccinonitrile (II), by reaction with a formate ester and a base. Etherification of the salts give the new ethers of formylsuccinonitrile (III). Free acetamidine condensed with the ethers of formylsuccinonitrile yields the 2-methyl-4-amino-5-pyrimidylacetonitrile (IV). Hydration of the nitrile group in the presence of sulfuric acid gives 2-methyl-4-amino-5-pyrimidylacetamide (V) which is utilizable in the preparation of vitamin $B_1$.

The process of this invention can be represented by the following scheme:

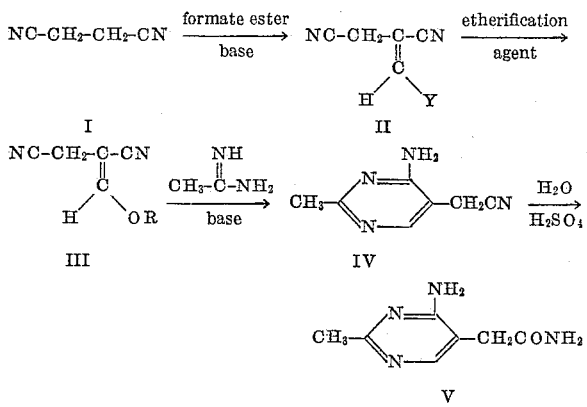

wherein Y is selected from the group consisting of alkali metals, alkaline earth metals and heavy metals; and R is selected from the group consisting of lower alkyl, lower alkylenyl and monocyclic aryl (lower alkyl).

To prepare the alkali metal salts of formylsuccinonitrile (II), succinonitrile (I) is interacted with a formate ester in the presence of a base. Although any formate ester is utilizable, the preferred esters are those of lower alkanols (e.g. methyl formate, ethyl formate and butyl formate). Bases utilizable include the alkali metals in the form of their alcoholates (e.g. sodium methylate and sodium ethylate) or their amides (e.g. sodamide).

To prepare the heavy metal salts, the alkali metal salts of formylsuccinonitrile are metathesized by treatment with a salt of the desired heavy metal, the reaction preferably being carried out in an aqueous medium employing a water-soluble salt of the heavy metal as a reagent. The resulting heavy metal salt of formylsuccinonitrile precipitates from solution and is recovered in the conventional manner, as by filtration or centrifugation.

To prepare the new ethers of formylsuccinonitrile (III), a salt of formylsuccinonitrile (II) is treated with an etherifying agent, such as the lower alkanol esters, the lower alkenol esters and the monocyclic aryl (lower alkanol) esters of mineral acids (e.g. dimethyl sulfate, diethyl sulfate, allyl chloride, and benzyl chloride).

The following examples are illustrative, but by no means limitative, of the invention [Examples II–VI being directed to the preparation of salts of formylsuccinonitrile; Examples VII–X being directed to the preparation of ethers of formylsuccinonitrile and Examples XI–XIV being directed to the preparation of 2-methyl-4-amino-5-pyrimidylacetonitrile]:

EXAMPLE I

Acidify a slurry of 195 g. (1.5 moles) of sodium formylsuccinonitrile in 500 ml. of 2B-alcohol with 77 g. (0.75 mole) of 95% sulfuric acid by slowly adding the acid, with stirring, keeping the temperature below 30° C. After addition of the acid, add charcoal, filter the mixture through a layer of diatomaceous earth, and wash the cake with three 250 ml. portions of alcohol; the resulting volume of the brown filtrate is about 730 ml.

EXAMPLE II

Sodium Formylsuccinonitrile

A solution of 256 g. (3.2 moles) of succinonitrile, 222 g. (3.0 moles) of ethyl formate, and 100 ml. of toluene is rapidly added to a stirred slurry (cooled to 5° C.) of 162 g. (3.0 moles) of anhydrous sodium methylate in 700 ml. of toluene. The temperature after rising to 56° C. cools to 45° C. and remains there for about 30 minutes. The now thick yellow slurry is reheated to 55° C. and allowed to cool to 45° C. The solid is then filtered and washed with 500 ml. of warm toluene. To assist drying, the solid is then washed with petroleum ether and dried with the aid of an infra red lamp to yield a light tan powder weighing about 350 g. (about a 90% yield). Decomposition occurs at about 215° C.

EXAMPLE III

Potassium Formylsuccinonitrile

A solution of 33 g. (0.50 mole) of 85% potassium hydroxide in 50 ml. of water is added in portions to 243 ml. of an ethanol solution containing 0.50 mole of formylsuccinonitrile. Addition of the potassium hydroxide solution is stopped when the pH becomes approximately 8.5. The light brown solution is allowed to evaporate first on a steam bath for 1½ hours and then in the air. After about a week a mixture of crystals and dark syrup is present. The crystals are filtered and washed with ethanol followed by methyl ethyl ketone. The light brown salt weighs about 25 g., representing about a 34.2% crude yield. Decomposition occurs at about 198° C. The crystals are dissolved in boiling methanol, the solution charcoaled, filtered, the filtrate reheated, and diluted with twice its volume of toluene. Light tan crystals separate which decompose at about 205° C. For further purification the solid is dissolved in hot ethanol, charcoaled, the filtrate reheated and diluted with toluene. The nearly colorless crystals decompose as before at about 204° C.

EXAMPLE IV

Lithium Formylsuccinonitrile

A warm, filtered solution of 21 g. (0.50 mole) of lithium hydrate monohydrate in 125 ml. of water is added in portions to 243 ml. of an ethanol solution containing 0.50 mole of formylsuccinonitrile. The resulting light brown solution is concentrated first on a steam bath and then in a vacuum desiccator, giving a mixture of syrup and crystals. The crystals are filtered and washed with methyl ethyl ketone, giving about a 26.3% crude yield. Decomposition of the air dried solid occurs at about 155° C. The product is dissolved in a small volume of hot methanol, the solution charcoaled, filtered, and the light tan filtrate reheated. Addition of three times the filtrate volume with toluene causes a lower layer to separate. The mixture is cooled in an ice bath with no change, but addition of a small quantity of ethanol gives a homogeneous solution. Additional toluene is added, but no precipitate forms and the light yellow solution is concentrated at room temperature under reduced pressure. Tan crystals are obtained which now decompose at about 161° C. For final purification the salt is dissolved in hot methanol, the solution charcoaled, and the filtrate diluted with methyl ethyl ketone and benzene. Removal of approximately two-thirds of the mixed solvents under reduced pressure gives light tan crystals which now decompose at about 302° C.

EXAMPLE V

Basic Cupric Formylsuccinonitrile Dihydrate

A solution of 130 g. (1.0 mole) of sodium formylsuccinonitrile in 350 ml. of water is prepared; the brown solution is treated with charcoal, filtered, and the filter cake washed with 50 ml. of water. The clear, light brown filtrate is added to a solution of 125 g. (0.50 mole) of copper sulfate pentahydrate in 500 ml. of water. Immediately a dirty green precipitate forms. The copper salt is filtered and washed well with water. The olive drab salt is then washed with ethanol and ether and air dried. The dry salt decomposes at about 110° C. and weighs about 86 g. The salt is slurried with water, filtered, and washed with ethanol and ether. The greenish-brown solid now weighs about 74 g. and decomposes at about 129° C. The filtrate is green, indicating solubility of the salt. Analysis gives values which suggest that a hydrated basic salt has formed. On this basis the original yield is about 38.6%.

EXAMPLE VI

Ferrous Formylsuccinonitrile

To a solution of 130 g. (1.0 mole) of sodium formylsuccinonitrile in 250 ml. of water, which has been charcoaled, filtered, and the funnel washed with 50 ml. of water, is added a solution of 90 g. (0.33 mole) of ferrous chloride hexahydrate in 150 ml. of water. On mixing the solutions, a deep reddish somewhat brown solution forms (characteristic of the ferrous complex with enols) and then a solid separates. Filtration and washing the precipitate with water and alcohol gives about 24 g. (about a 18.6% yield) of rust colored solid. Decomposition occurs at about 198° C.

EXAMPLE VII

Methoxymethylenesuccinonitrile

Sodium formylsuccinonitrile [350 g. (2.86 moles)] is stirred with 800 ml. of toluene; 378 g. (3.0 moles) of dimethyl sulfate is added about 10 minutes later. The slurry is warmed to 50° C.; the heat source is removed and the temperature remains at about 50° C. and then slowly rises (the temperature is kept between 55–60° C. by intermittent cooling). The slurry changes in appearance and the toluene becomes colored. The reaction is exothermic for a little more than an hour. When the temperature begins to fall, the slurry is heated to 70° C. and then allowed to cool. The by-product, sodium methyl sulfate is filtered and washed with toluene. The brown filtrate is treated with charcoal, filtered, and the toluene removed under reduced pressure. A forerun, distilling at 70–80° C./2.0 mm., plus a small amount up to 120° C./0.5 mm., and weighing 40 g. is collected. The product comes over colored (mechanical carry-over) at 120–140°/0.5 to 2.0 mm. and weighs about 232 g. Redistillation through a short Vigreaux column gives a slight forerun and the product is collected from 122°/1.0 mm. to 144° C./3.0 mm.; recovery about 214 g. Some color is still present and a final distillation gives about 208 g. (about 77.5%) of colorless liquid, boiling from about 120° C./0.5 mm. to 135° C./2.0 mm.

EXAMPLE VIII

Ethoxymethylenesuccinonitrile

To 130 g. (one mole) of sodium formylsuccinonitrile stirred with 350 ml. of absolute methanol is added 154 g. (1.0 mole) of diethyl sulfate; the stirred mixture is refluxed for 5 hours. Charcoal is added, the solution is heated for an additional ½ hour and the mixture is filtered hot. On filtration sodium ethyl sulfate separates requiring an additional 500 ml. of hot methanol for filtration. The brown filtrate is diluted with water and extracted, first with benzene and then with ethyl acetate. Removal of the combined solvents gives a brown oil which is collected at 115–125° C./0.1 mm. as a pale yellow liquid. The semi-purified yield is about 62 g. (about 45.6%). Refractionation gives a light yellow liquid, B.P. about 111–118° C./0.1 mm.

EXAMPLE IX

Allyloxymethylenesuccinonitrile

To a dark brown solution resulting from stirring 169 g. (1.30 moles) of sodium formylsuccinonitrile in 350 ml. of dimethylformamide is added 115 g. (1.50 moles) of allyl chloride. The stirred mixture is heated; reflux begins at an internal temperature of about 65° C.; in 30 minutes the temperature is about 85° C. and in 45 minutes about 100° C. After 1 hour the temperature is about 105° C. and does not rise after 45 more minutes of heating. Approximately 200 ml. of solvent is removed under reduced pressure, charcoal is added, and the dark mixture filtered. The filtrate is diluted with water and thoroughly extracted with benzene. The benzene is then removed under reduced pressure, leaving a residual dark oil. On distillation, a forerun results, B.P. about 50–113° C./0.1 mm. Refractionations give nearly colorless liquid, B.P. about 113–124° C./0.075–0.10 mm.

EXAMPLE X

Benzyloxymethylenesuccinonitrile

To 138 g. (1.0 mole) of sodium formylsuccinonitrile stirred at room temperature with 300 ml. of the monomethyl ether of ethylene glycol, is added 126.5 g. (1.0 mole) of benzyl chloride; the stirred mixture is heated at 100° C. for 5 hours. To the resulting dark mixture, neutral to pH of paper, charcoal is added and, after filtration the brown filtrate is diluted with water, causing an oil to separate. The mixture is extracted with benzene and the benzene removed under reduced pressure. The residual brown oil is distilled under vacuum, giving a forerun, collected at 55–150° C./0.1 mm. A tan oil [about 122 g. (about 62%)] collects at about 150–180° C./0.1 mm. Refractionations give a light yellow oil, B.P. about 162–166° C./0.075 mm.

The sodium formylsuccinonitrile of Examples VII–X may be replaced by other salts of formylsuccinonitrile (e.g. the potassium, lithium, cupric and ferrous salts) in the preparation of the ethers of formylsuccinonitrile.

EXAMPLE XI

2-Methyl-4-Amino-5-Pyrimidylacetonitrile

To a solution of 13.5 g. (0.25 mole) of sodium methylate in 100 ml. of 2B-alcohol is added 22.6 g. (0.25 mole) of acetamidine hydrochloride; the salt is filtered and washed with 50 ml. of ethanol. The clear filtrate is then mixed with 24.4 g. (0.20 mole) of methoxymethylenesuccinonitrile at room temperature. The stirred solution becomes yellow and then brown and the temperature rises to about 60° C. The solid separates and the mixture becomes dark in color. The mixture is cooled to 10° C. and the solid filtered. Washing with alcohol and ether removes much of the color. The solid is allowed to air dry and the black filtrate is allowed to evaporate at room temperature, leaving a tar. The brown solid decomposes at about 255° C. and weighs about 13.0 g. (about a 47% yield). The pyrimidine is soluble in a large volume of water or ethanol. The bulk of the solid is dissolved in boiling water; the solution is then charcoaled and filtered. A grey solid, weighing about 8.0 g. is obtained (it decomposes at about 255° C.). The solid is redissolved in boiling water, charcoaled, filtered, and the light green filtrate allowed to cool. The grey solid is filtered, washed with water and ether and air dried. Decomposition occurs at about 255° C. and the recovery is about 5.0 g.

EXAMPLE XII

2-Methyl-4-Amino-5-Pyrimidylacetonitrile

A sodium ethylate solution is prepared by reacting 10.5 g. (0.45 mole) of sodium with 150 ml. of 2B-alcohol. The stirred mixture is blanketed with nitrogen and 47.3 g. (0.50 mole) of acetamidine hydrochloride is added at room temperature. After a short interval, 45 g. (0.33) of ethoxymethylenesuccinonitrile is rapidly added at 26° C. The temperature slowly rises to about 45° C., remains there 5 minutes, and falls. When room temperature is reached, the tan solid is filtered, washed well with cold water, and dried in a steam oven. The yield of tan product, decomposing at about 246° C., is about 35 g. (about 72% yield). The material is mixed with 200 ml. of water and 30 g. of concentrated hydrochloric acid. The mixture is heated to boiling, the solution treated with charcoal, filtered, and the cold filtrate made alkaline with aqueous ammonia. The light tan precipitate is filtered, washed with ice water, and air dried. The solid weighs about 22 g.

EXAMPLE XIII

2-Methyl-4-Amino-5-Pyrimidylacetonitrile

After reacting 10.4 g. (0.45 mole) of sodium with 150 ml. of 2B-alcohol, the stirred mixture is blanketed with nitrogen gas and 47.3 g. (0.50 mole) of acetamidine hydrochloride is added. Within a short time, 49 g. (0.33 mole) of allyloxymethylenesuccinonitrile is rapidly added. The temperature rises quickly to about 50° C. at which point the slurry is then cooled to 45° C. The temperature remains at 45° C. for almost 15 minutes and then slowly falls. The light colored slurry is heated to 60° C. and then allowed to cool to room temperature. The mixture is filtered and the solid thoroughly washed with cold water. After air drying, the light tan product weighs about 20 g. (about a 41% crude yield) and decomposes at about 247° C. The solid is dissolved in 100 ml. of boiling water which contains 15 g. of concentrated hydrochloric acid. Charcoal is added, the solution filtered, and the filtrate made alkaline with aqueous ammonia. The precipitate is nearly colorless and after drying weighs about 9.0 g. and decomposes at about 254° C.

EXAMPLE XIV

2-Methyl-4-Amino-5-Pyrimidylacetonitrile

A solution of sodium ethylate is prepared by dissolving 11.5 g. (0.50 mol) of sodium in 150 ml. of 2B-alcohol. After cooling to 35° C., 52 g. (0.55 mole) of acetamidine hydrochloride is added and the mixture stirred 15 minutes. During this time and for the remainder of the experiment nitrogen gas is passed through the system. Benzyloxymethylenesuccinonitrile (79.2 g., 0.40 mole) is rapidly added at 26° C. to the stirred slurry. The color changes to yellow and then tan and the temperature rapidly rises. When 60° C. is reached, the mixture is cooled to 55° C. The temperature remains at 55° C. for about 10 minutes and then slowly falls. When room temperature is reached, the now brown solid is filtered and thoroughly washed with ice water to remove sodium chloride. The air dried solid weighs about 44 g. (about a 74% crude yield of product). Decomposition occurs at about 255° C. For purification the solid is dissolved in hot dilute hydrochloric acid, the solution charcoaled, and the tan filtrate made alkaline with ammonium hydroxide. The tan solid now decomposes at about 252° C.

The invention may be variously otherwise embodied within the scope of the appended claims.

What is claimed is:

1. An ether of formylsuccinonitrile of the formula

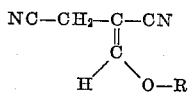

wherein R is selected from the group consisting of lower alkyl, lower alkenyl and benzyl.

2. The process of preparing a salt of formylsuccinonitrile selected from the group consisting of alkali metal and alkaline earth metal salts of formylsuccinonitrile, which comprises reacting a formate ester of a lower alkanol and a base selected from the group consisting of alkali metal and alkaline earth metal hydroxides, alcoholates and amides with succinonitrile.

3. The process of preparing an ether of formylsuccinonitrile of the formula

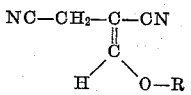

wherein R is selected from the group consisting of lower alkyl, lower alkenyl and benzyl, which comprises reacting a salt of formylsuccinonitrile selected from the group consisting of alkali metal, alkaline earth metal and heavy metal salts of formylsuccinonitrile, with a compound selected from the group consisting of lower alkanol esters, lower alkenol esters and benzyl alcohol esters of mineral acids.

4. The process of preparing 2-methyl-4-amino-5-pyrimidylacetonitrile which comprises condensing acetamidine with an ether of formylsuccinonitrile of the formula

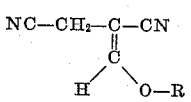

wherein R is selected from the group consisting of lower alkyl, lower alkenyl and benzyl.

5. Methoxymethylenesuccinonitrile.
6. Ethoxymethylenesuccinonitrile.
7. Allyloxymethylenesuccinonitrile.
8. Benzyloxymethylenesuccinonitrile.

References Cited in the file of this patent

UNITED STATES PATENTS

| | | |
|---|---|---|
| 2,235,638 | Hromatka | Mar. 18, 1941 |
| 2,271,503 | Wuest et al. | Jan. 27, 1942 |
| 2,683,659 | Schlesinger et al. | July 13, 1954 |

OTHER REFERENCES

Chemical Abstracts, vol. 32, page 500 (1938).
Diels et al.: Beilsteins "Handbuch," 4th ed., 2nd sup., page 481 (1942).